United States Patent [19]

Neiman

[11] Patent Number: 4,928,834
[45] Date of Patent: May 29, 1990

[54] SAFETY BEAM LOCK

[75] Inventor: Richard D. Neiman, Chester Springs, Pa.

[73] Assignee: Vesper Corporation, Bala-Cynwyd, Pa.

[21] Appl. No.: 203,172

[22] Filed: Jun. 6, 1988

[51] Int. Cl.$^5$ .................................. A47B 47/00
[52] U.S. Cl. .............................. 211/191; 211/208
[58] Field of Search .............. 211/191, 192, 193, 189, 211/208; 108/107

[56] References Cited

U.S. PATENT DOCUMENTS

| | | | |
|---|---|---|---|
| 1,007,843 | 11/1911 | Botsford . | |
| 1,154,371 | 9/1915 | Carter . | |
| 2,200,047 | 5/1940 | Tinnerman | 24/259 |
| 2,839,805 | 6/1958 | Bedford, Jr. | 24/84 |
| 2,876,515 | 3/1959 | Saffer . | |
| 2,887,291 | 5/1959 | Holmquist | 248/247 |
| 3,177,988 | 4/1965 | Costantini et al. | 169/36 |
| 3,510,010 | 5/1970 | Gasner | 211/192 |
| 3,675,958 | 7/1972 | Duffy . | |
| 3,770,135 | 11/1973 | Schild | 211/193 |
| 3,871,525 | 3/1975 | Al-Dabbagh et al. | 211/191 |
| 4,074,812 | 2/1978 | Skubic et al. | 211/191 X |
| 4,287,994 | 9/1981 | Klein | 211/191 |

OTHER PUBLICATIONS

Penco Bulletin W-87 "Wide Span Shelving" (see p. 4).

*Primary Examiner*—Alvin C. Chin-Shue
*Assistant Examiner*—Sarah A. Lechok
*Attorney, Agent, or Firm*—Eugene Chovanes

[57] ABSTRACT

A safety lock for securing the end of a horizontal beam to a vertical post in a structural frame for wide span shelving. A tab on the end of the beam forces the side of an open box-shape post with slots in the side to yield during assembly of the beam to the post. When the tab enters a slot on the post side, the side springs back, locking the tab in the slot to prevent the dislodgment of the beam from the post.

9 Claims, 2 Drawing Sheets

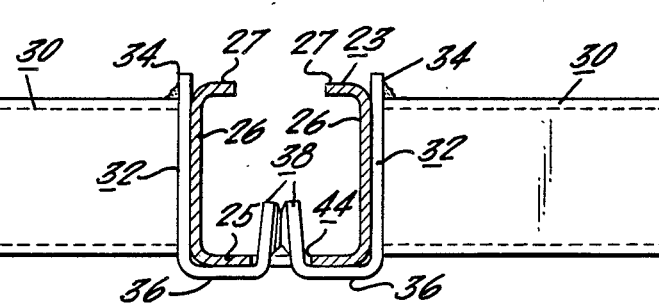
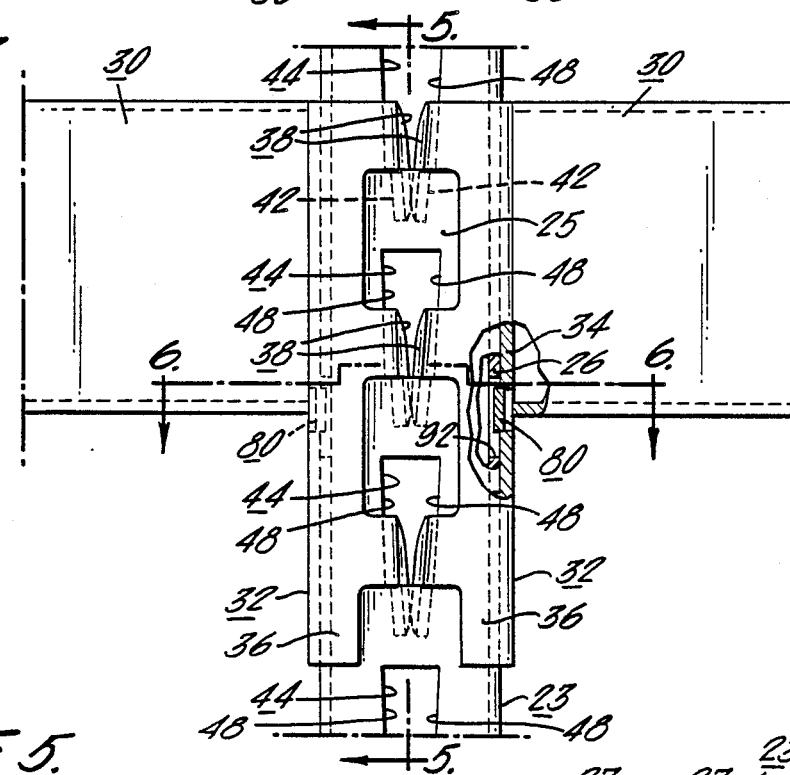
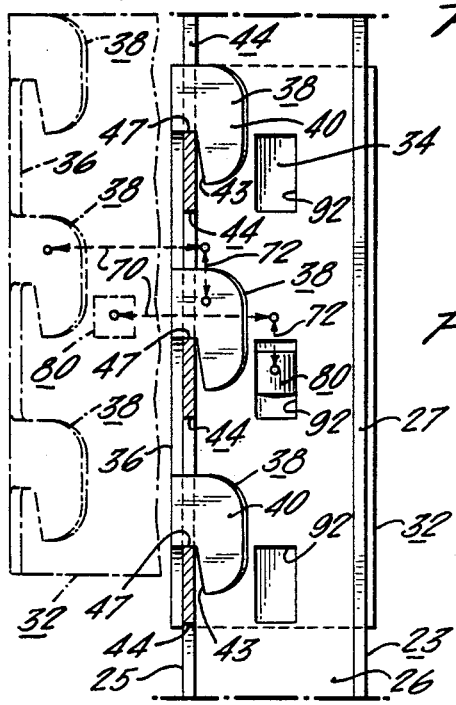
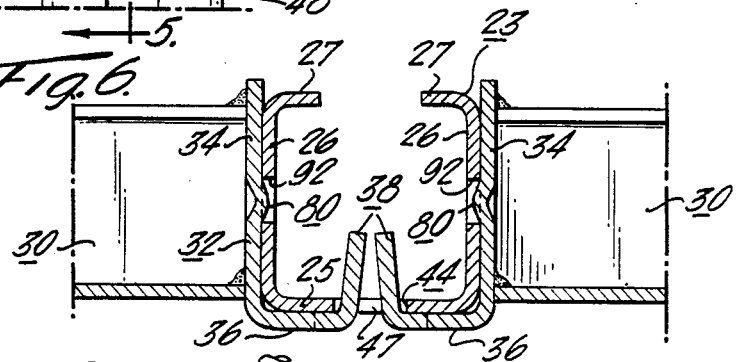
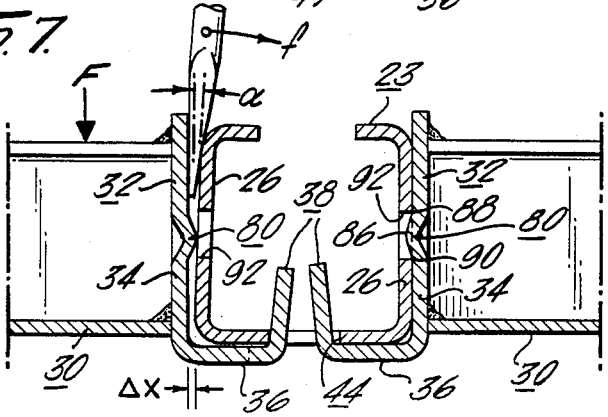

SAFETY BEAM LOCK

BACKGROUND OF THE INVENTION

(1) Field of the Invention

The invention pertains to metal structural frames for shelving used in commercial and industrial applications, and more particularly to metal structural frames for wide span shelving. Such frames are assembled from standard components, including posts, beams and reinforcing members. The shelving is supported from the structural frames.

(2) The Prior Art

Shelving supported by metal structural frames is used for storing a wide variety of products, including large or bulky loads.

Wide span shelving is often used for loads that are high, wide or bulky. A typical wide span shelf may have a length of 72" and a depth of 42". Lengths vary from 48" to 96" and depths from 18" to 60".

Wide span shelving utilizes a structural frame assembly that supports the shelves themselves.

The structural frame assembly has upright end frames connected by horizontally extending rigidity beams secured to posts in the end frames.

The components are fabricated for fast, easy assembly and are of boltless construction. The horizontal rigidity beams, for instance, in some cases engaged the uprights posts in the end frames by means of load bearing lugs on the end of the beams which hook into slots on the posts.

In view of the wide spans, it is important that the upright frames and beams be securely fastened to one another so that the structural frame does not collapse under load or from an accidental blow that would dislodge the components from one another, particularly at the post and beam connection.

Separate fasteners, including spring steel locking clips, are often used to lock the beam to the post. Separate fasteners, including spring steel locking clips, require added effort and expense to make and insert, and can be easily lost. Sometimes, such fasteners are inadvertently omitted during the assembly process, creating weak points in the assembly vulnerable to dislodgment.

SUMMARY OF THE INVENTION

The present invention eliminates the need for separate fasteners including locking clips. The joint is automatically locked during assembly.

A safety beam lock is stamped into the end of the beam, and made integral therewith. In assembly of the shelving, when the beam and lugs thereon are engaged in holes in the posts, in the prior art fashion, the beam lock of the invention engages a slot in the side of the post.

The post is of open box construction wherein a side flexes inwardly during the assembly of the beam end to the post under the force of the beam lock, and then springs back once the lock enters the slot.

The safety beam lock, when engaged, primarily prevents the accidental dislodgment of the beam from the post by, for instance, a blow during loading or unloading, or by a rocking of the entire frame where, for instance, a forklift truck accidentally bumps into the shelves.

BRIEF DESCRIPTION OF THE DRAWINGS

FIG. 3 is a fragmentary front elevational view of the beam and post connection, in engagement, as designated in FIG. 1.

FIG. 4 is a fragmentary top plan section of the post showing the beams engaged in the post.

FIG. 5 is a vertical sectional elevation, taken in the plane 5—5 of FIG. 3, with the beam end prior to assembly shown in phantom added.

FIG. 6 is a fragmentary horizontal section taken on the line 6—6 of FIG. 3.

FIG. 7 is a sectional view similar to FIG. 6, showing a tool inserted to disengage the post.

DESCRIPTION OF THE PREFERRED EMBODIMENT

Prior Art

Figure 1:
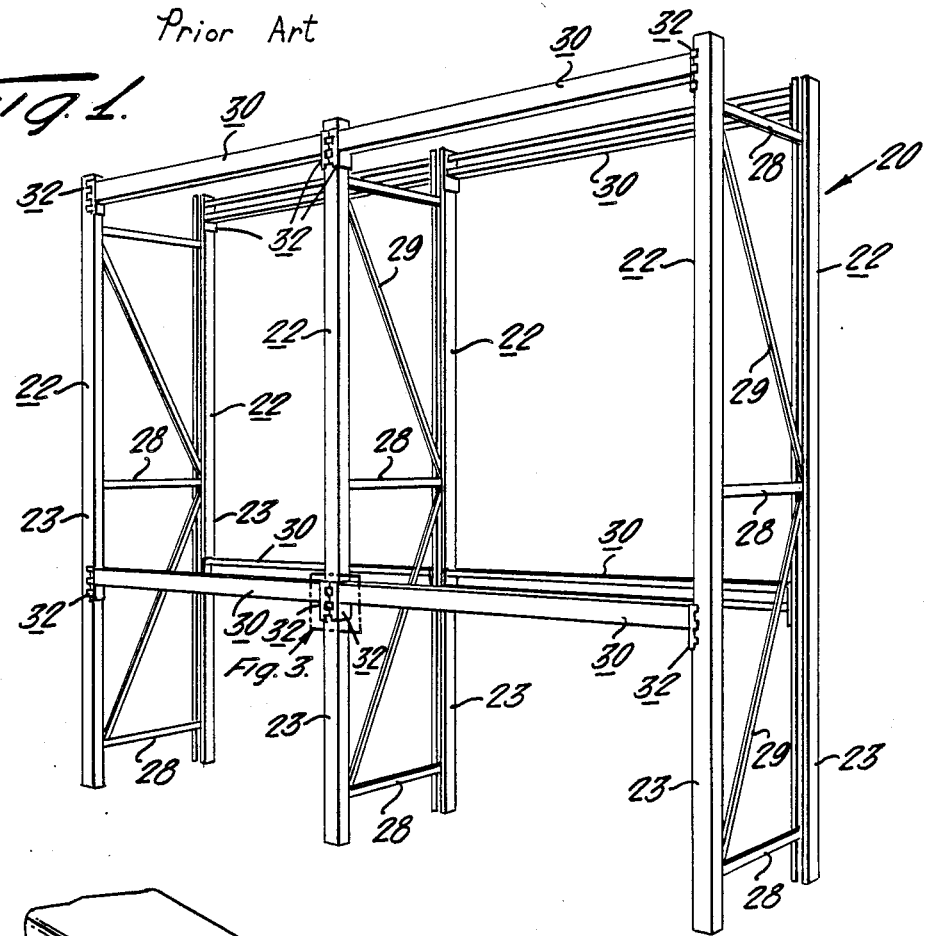
FIG. 1 is a perspective view of the structural frame of a wide span shelf assembly, without the shelves.
Figure 2:
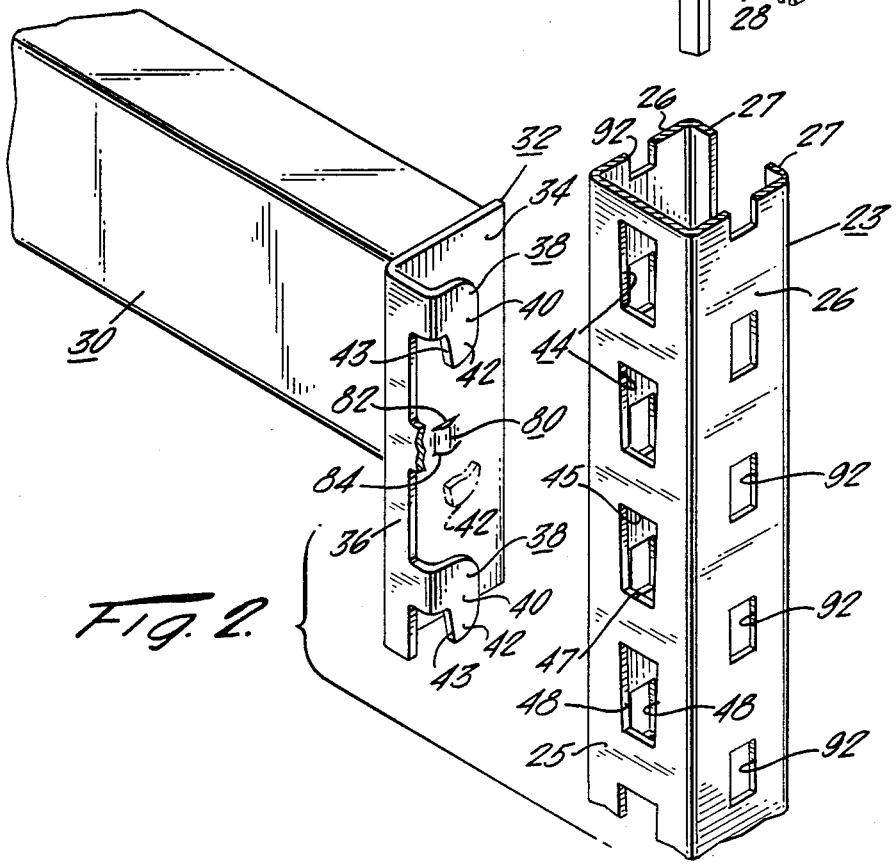
FIG. 2 is a fragmentary perspective view of the structural vertical post and the horizontal beam end, prior to assembly.

As best seen in FIG. 1, wide span shelving is formed of a structural frame assembly 20 that is intended to support thereon the wide span shelves themselves. These shelves may be of a metal or wood construction and secured to the structural frame assembly 20 by any known means which may include use of brackets or the like. Such shelving and fastening to the structural frame assembly is well known and omitted from the drawings for the sake of clarity.

The frame assembly 20 is formed of upright end frames 22 which are spaced to accommodate the length of the desired shelving.

The end frames 22 are formed of front and rear posts 23 secured by horizontal braces 28 and diagonal braces 29 welded to the posts.

Posts 23 are formed of rolled heavy gauge steel and are of an open box-shape construction in cross section, having a front 25, sides 26, and back flanges 27.

Posts 23 have in their front face 25 vertically spaced slots 44 having a top edge 45 and a bottom edge 47 and converging side edges 48.

Horizontal rigidity beams 30 are secured to the posts 23 at the ends of the beams. Each beam 30 has at both ends an end plate 32 welded to the beam. End plate 32 is formed of a web portion 34, a shoulder portion 36 at a right angle to the horizontal braces 28 and the diagonal web portion 32 and lugs 38 formed at an angle to shoulder 36 as seen specifically in FIGS. 2 through 7. Lugs 38 have a body portion 40 and a wedge portion 42, having a wedge face 43.

In assembly of the horizontal rigidity beams 30 to upright end frames 22, lugs 38 are engaged in slots 44 by first bringing web portion 32 into engagement with posts 23 whereby the lugs are so disposed that they can be entered into slot 44 horizontally. Lug 38 has a height which is less than the height of slot 44 so that entry can be easily made.

The beam 30 is then forced downwardly when the lug 38 is within the slot 44 so that the body portion 40 of the lug 38 rests on bottom edge 47 of slot, as best seen in FIG. 5.

Also seen in FIG. 5 is the horizontal movement designated 70 and the downward vertical movement designated 72 of the lug 38 into the slot 44, wherein the end plate 32 is shown in phantom outside the post 23 prior to placement into the post, and end plate 32 is shown in solid on the post after placement. It will be seen that wedge portion 43 of the lug 38 extends below the slot 44 wherein wedge face 43 has served to securely bring and hold shoulder 36 of end plate 32 securely against the front face 25 of post 23.

Additionally, as best seen in FIGS. 3, 4 and 6, the lug 38 is disposed at a slight angle as seen in cross section with respect to shoulder 36 of the plate wherein the beam end as it is inserted horizontally into the post slot 44 causes end plate web 34 to be drawn tightly against post side 26. Additionally, slot 44 has sides 48 which are tapered inwardly in a downward direction whereby end plate web 32 is additionally tightened against post side 26 as beam 30 is forced downwardly, as at 72 in FIG. 5.

It will be understood that the post, other than at the ends of the frame assembly, will have beams connected from each side as shown in FIGS. 3, 4, 6 and 7. Those at the end of the structural frame assemblies will only have one beam connection.

Where there are two beam connections into a post, the lugs will contact one another in a slight interference relationship at the bottom of the lugs as seen best in FIGS. 3 and 4. This provides an additional secure relationship when the structural frames are assembled. The structural frame assembly as described is structurally strong in this state.

In the prior art, clips or other fasteners were inserted at this stage of the assembly to provide continued firm and secure connections.

The Invention

A locking tab 80 is stamped into web 34 of end plate 32 before the end plate is welded to the rigidity beam 30. Locking tab 80 has an upper cut or slit 82 and a lower cut 84. The tab is angular in horizontal cross section and has apex 86 and base lines 88 and 90. The height of the apex above the plane of web 34 is slight, and at most a fraction of an inch. The tab is formed in the web portion at a portion which will correspond to one of the rectangular slots 92 in the sides 26 of post 23. The length of the tab is less than the height of slot 92, as best seen in FIG. 5, whereby there is space between the upper edge of the tab and the upper edge of a slot when the tab is in place. This prevents any interference during assembly while still maintaining the locking function of the tab to secure the end beam at the post.

In assembly of an end beam to a post as above described, there is a give or yield of the open box post under the influence of the locking tab as the end beam is pushed horizontally as at 70, as shown in FIG. 5. The tab itself is of an unyielding construction in the web which in turn is unyielding as it is securely welded to the rigidity beam at the end thereof.

The angled locking tab causes the side of beam 23 to flex under the influence of the rearward movement of the lug 38 which, as seen in FIGS. 3, 4 and 6 and 7, is angled in the horizontal cross section plane to provide a jamming wedging action. Additionally, as the beam is forced downwardly to seek the lug as at 72 in FIG. 5, the tapered sides 66 of side slot 60 further force web 32 with locking tab 80 against post side 26.

The relative movement between the end of the rigidity beam 30 and the post 23 as described above in inserting a beam 30 end into a post 23, causes a flexing of the side 26 of post 23 because of the interference of the locking tab 80 until the locking tab 80 enters into the side slot 92 as shown particularly in FIG. 5 wherein the side 26 then springs back into its box position as seen in FIG. 6. Any upward movement of the beam relative to the post, with a subsequent dislodgment, is now prevented since the top of the locking tab 80 comes into abutting relationship with the top of side slot 92 preventing any further movement and locking the beam to the post.

In the event it is necessary or desirable to disassemble the beams from the frames, a suitable way is to apply a force F by means of a screw driver or the like as shown in FIG. 7 between the post side 26 and beam 30 end plate 32, and then rotate the screw driver as shown, using force f, causing the post side 26 to spring inwardly to an angle α until the locking tab 80 is clear of the side slot 92. While the side 26 is so pushed, the beam end plate 32 is forced upwardly with respect to the post 26 in the reverse direction of insertion, and then withdrawn horizontally.

As seen in FIG. 7, it is necessary to spring post side 26 a distance Δ to clear the tab 80 from the post side 26. It is also necessary for post side 26 to give to this extent during the assembly procedure as described above.

I claim:

1. In a metal structural frame for shelving having
   (1) upright posts
      (a) of open box construction in cross section with
      (b) a front face and sides extending from the front face, and
      (c) spaced vertical slots in the front face; and
   (2) horizontal beams having
      (a) a plate at the end of a beam, and
      (b) lugs extending from the plate in a direction generally transverse to the beam;
   wherein a beam is connected to a post by engaging the lugs in the slots; the improvement comprising a safety lock for preventing dislodgment of the beam from the post, having
      (1) vertically spaced slots in the post sides,
      (2) a tab projection at the end of the beam extending from the plate for
         (a) causing the post side to yield inwardly during engagement of the beam lugs into the post front face slots, and
         (b) entering a slot on the post side when the lugs are fully engaged in the front face slots;
   wherein the post side springs back outwardly, locking the tab projection in the post side slot, thus preventing the lugs from being disengaged from the post front face slot, and from being dislodged from the post.

2. A lock of claim 1 wherein the tab is of a triangular cross section having the base of the triangle secured to the end plate and the apex of the triangle extending toward the post during engagement of the beam to the post.

3. A lock of claim 1 wherein the tab has tapering sides that aid in causing the post side to yield inwardly during engagement of the beam lugs into the post front face slots.

4. A lock of claim 1 wherein the tab can be disengaged by forcing the post side to yield to an extent that permits the tab to clear the post side slot, so that the beam lugs can be disengaged from the post front face slots.

5. A lock of claim 1 wherein the post front face slots have sides tapered inwardly downwardly, whereby the end plate is forced tightly against the post side.

6. A lock of claim 1 wherein the lugs have a wedge-shaped portion that forces the end plate tightly against the post front face.

7. A lock of claim 1, wherein the post has rear flange portions extending inwardly from the sides.

8. A lock of claim 1 wherein the tab has a height less than the post side slot height, and the tab is positioned to extend centrally within the slot when the lugs are fully seated in the post from face slots.

9. A lock of claim 1 wherein the lugs in the same post front face slot on one beam end yieldably engage at the bottom thereof tightly with the bottom of the lugs on adjacent beam and, the lugs being slightly angled toward one another, and the inwardly tapering side of the post front face slot forcing the lugs toward one another as the lugs are fully engaged in the post slots.

* * * * *